Sept. 19, 1939.    R. E. FRANKLIN    2,173,552
PIEZOELECTRIC CRYSTAL DEVICE
Filed March 17, 1938
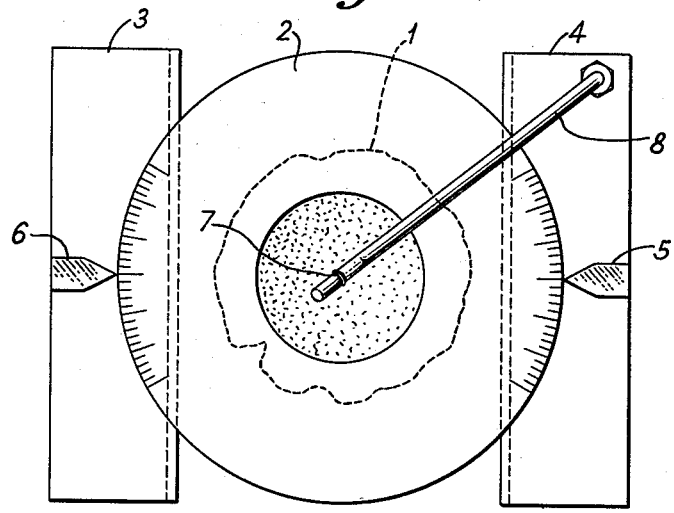
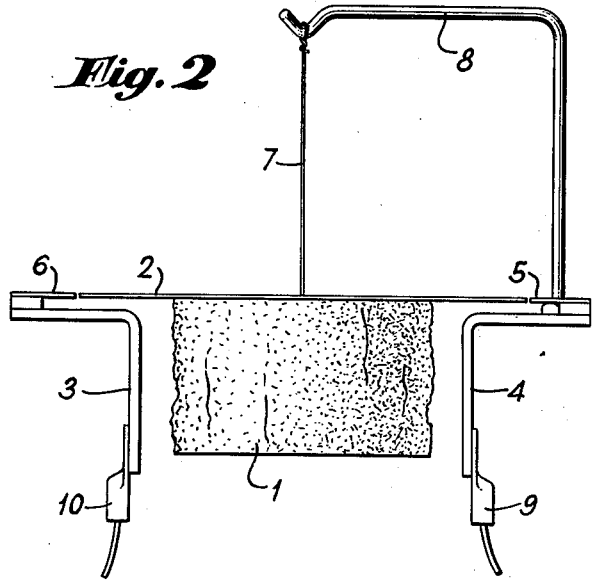
INVENTOR.
RALPH E. FRANKLIN
BY
ATTORNEY.

Patented Sept. 19, 1939

2,173,552

UNITED STATES PATENT OFFICE 2,173,552

PIEZOELECTRIC CRYSTAL DEVICE

Ralph E. Franklin, Patchogue, N. Y., assignor to Radio Corporation of America, a corporation of Delaware Application March 17, 1938, Serial No. 196,527

7 Claims. (Cl. 175—183)

This invention relates to the piezo-electric art and deals specifically with a method and device for the locating of an electric axis in the crystalline quartz structure where no natural face exists on the specimen to be examined.

An object of this invention is to provide a new and novel method of determining an electric axis in a piezo-electric crystal which normally could not be used as electric oscillators due to the fact that no natural faces of the crystal existed.

It is well known that there are certain crystals, especially of quartz, which do not have appearing on their surfaces any natural faces, due to breaking, or wearing away of such faces by the elements, and these therefore cannot be used as oscillators. Such crystals are known as "river washings" quartz. I have found that such crystals are desirable to be used as piezo-electric crystal oscillators for the reason that they contain a finer quality of crystalline structure in that the quartz is freer from twining, needles or similar defects and, in other words, they generally are more perfect in molecular structure, the probable reason for this being that in localities where crystalline quartz is prevalent, the more perfect crystals are less tightly bound to other crystals and hence more easily removed by the elements of nature.

The use of such type of crystals known as "river washings" has a really serious disadvantage for use as piezo-electric oscillators by reason of the fact that generally all traces of natural faces have been removed by erosion through the ages, in some river bed, and without some natural faces appearing thereon from which to determine the crystalline axis, it is impossible to determine the electric axis of such crystal without elaborate and expensive equipment. Furthermore, "river washings" quartz, besides being generally of better quality, can easily be purchased for about one-tenth the price of clear quartz having at least one of its natural faces readily determined.

The device of this invention may best be understood by referring to the accompanying drawing, in which:

Fig. 1 is a plan view of a quartz crystal suspended between suitable apparatus in which an electric field is applied; and Fig. 2 is an elevation of Fig. 1.

Referring now in detail to the drawing, the quartz crystal 1 is prepared for determining the electric axis by first determining the optic axis by any one of the well-known methods, such as suspending in cedar or similar oil and viewing with polarized light. After the optic axis is determined roughly, the quartz crystal is sectionalized perpendicular to the optic axis and then the section is accurately lapped exactly perpendicular to its optic axis by means of interference of polarized light. The prepared section is then suspended by means of a thread at the center of its rotation which may be easily found by attaching the thread to a small rubber suction cup and swinging it until the center of rotation of the crystal is found. A graduated scale 2 which comprises any suitable material, such as a celluloid disc, is then cemented to the top of the quartz crystal section by any suitable means so that its center coincides with the center of rotation of the quartz. The quartz section is then suspended by means of a thread 7 to support 8 between two electrodes 3 and 4 which are provided with terminals 9 and 10 for connecting to a high voltage source, not shown. Each electrode has located on its upper surface suitable indices 5 and 6.

In the operation of this device, the crystal is suspended between electrodes 3 and 4 and a high direct current voltage potential in the order of five to ten thousand volts is impressed between terminals 9 and 10. It will be found that the quartz section will then rotate until an electric axis lines up with the electrostatic lines of force between electrodes 3 and 4. The pointers are then read and after the high potential is removed, the axis can be suitably marked on the quartz. All three of the electric axes may be determined in this manner.

While only one device for determining the electric axis of a piezo-electric crystal has been disclosed, it is to be distinctly understood that this invention should not be so limited.

What is claimed is:

1. A device for determining the electric axis of a piezo-electric crystal comprising two electrodes arranged opposite each other, an index on each electrode, a movable scale interposed between said electrodes, means for suspending a piezo-electric crystal between said electrodes, means for attaching said movable scale to said crystal, and means for applying a high voltage to said electrodes to rotate the crystal until an electric axis is determined.

2. The method of determining the electric axis of a piezo-electric crystal including the steps of freely suspending the crystal between two electrodes, applying an electric field to said electrodes, determining and marking the position assumed by said crystal.

3. A device for determining the electric axis of a piezo-electric crystal comprising two electrodes arranged opposite each other, an index on each electrode, a movable scale having graduations thereon interposed between said electrodes, means for suspending a piezo-electric crystal between said electrodes, means for attaching said movable scale to said crystal, and means for applying a high voltage to said electrodes to rotate the crystal until an electric axis is determined.

4. A device for determining the electric axis of a piezo-electric crystal comprising two electrodes arranged opposite each other, an index on each electrode, a movable scale interposed between said electrodes, an upright support arm for suspending a piezo-electric crystal between said electrodes, means for attaching said movable scale to said crystal, and means for applying a high voltage to said electrodes to rotate the crystal until an electric axis is determined.

5. A device for determining the electric axis of a piezo-electric crystal comprising two electrodes arranged opposite each other, an index on each electrode, a movable scale interposed between said electrodes, an upright support arm secured to one of said electrodes for suspending a piezo-electric crystal between said electrodes, means for attaching said movable scale to said crystal, and means for applying a high voltage to said electrodes to rotate the crystal until an electric axis is determined.

6. The method of determining the electric axis of a piezo-electric crystal when all traces of its natural faces have been eradicated including the steps of freely suspending the crystal between two electrodes, applying an electric field to said electrodes, determining and marking the position assumed by said crystal.

7. The method of determining the electric axis of a piezo-electric crystal including the steps of viewing said crystal with polarized light to determine the optic axis, sectionalizing said crystal perpendicular to the optic axis, freely suspending the crystal between two electrodes, applying an electric field to said electrodes, and determining and marking the position assumed by said crystal.

RALPH E. FRANKLIN.